United States Patent
Guo et al.

(10) Patent No.: US 11,859,365 B2
(45) Date of Patent: Jan. 2, 2024

(54) SYSTEM FOR BRIDGE SCOUR MULTI-SOURCE MONITORING, MONITORING METHOD THEREOF, AND SCOUR DEPTH EVALUATING METHOD THEREOF

(71) Applicant: ZHEJIANG UNIVERSITY OF TECHNOLOGY, Zhejiang (CN)

(72) Inventors: Jian Guo, Zhejiang (CN); Jiyi Wu, Zhejiang (CN); Bing Jiang, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 437 days.

(21) Appl. No.: 17/336,334

(22) Filed: Jun. 2, 2021

(65) Prior Publication Data

US 2021/0404139 A1 Dec. 30, 2021

Related U.S. Application Data

(63) Continuation of application No. PCT/CN2020/101026, filed on Jul. 9, 2020.

(30) Foreign Application Priority Data

Jun. 29, 2020 (CN) .......................... 202010603014.8

(51) Int. Cl.
    *E02D 33/00* (2006.01)
    *H04W 4/38* (2018.01)

(52) U.S. Cl.
    CPC .............. *E02D 33/00* (2013.01); *H04W 4/38* (2018.02); *E02D 2600/10* (2013.01)

(58) Field of Classification Search
    CPC ....... E02D 2600/10; E02D 33/00; H04W 4/38
    See application file for complete search history.

(56) References Cited

U.S. PATENT DOCUMENTS

| | | | | |
|---|---|---|---|---|
| 6,100,700 A | * | 8/2000 | Yankielun | H04B 13/02 367/13 |
| 6,121,894 A | * | 9/2000 | Yankielun | G01N 17/00 340/870.31 |
| 2011/0012728 A1 | * | 1/2011 | McCane | G01S 5/0027 33/366.12 |

FOREIGN PATENT DOCUMENTS

| | | | | |
|---|---|---|---|---|
| CN | 108678034 | | 10/2018 | |
| CN | 108678034 A | * | 10/2018 | ............. E02D 33/00 |
| CN | 114323153 A | * | 4/2022 | |

* cited by examiner

*Primary Examiner* — Andre J Allen
(74) *Attorney, Agent, or Firm* — JCIPRNET

(57) ABSTRACT

The present invention discloses a system for bridge scour multi-source monitoring, including an intelligent monitoring system, a data industrial personal computer, a 5G remote communication transmission system and a remote scour depth evaluation center. The intelligent monitoring system consists of three subsystems including a high-frequency real-time bridge dynamic characteristic monitoring system, an adjustable sound velocity underwater depth monitoring system and a scoured seabed soil pressure change testing system, which are coupled with one another to carry out triggering control to acquire lateral pile data, thereby forming a multi-source bridge local scour real-time sensing monitoring system, and realizing integration of clock synchronization, dynamic control of scour environment conditions, contact sensors and non-contact sensors. The system carries out integrated monitoring on a scour interface, seabed silt scour and deposition as well as bridge dynamic response, and a structural scour depth evaluating method provides bases for bridge maintenance.

15 Claims, 5 Drawing Sheets

SYSTEM FOR BRIDGE SCOUR MULTI-SOURCE MONITORING, MONITORING METHOD THEREOF, AND SCOUR DEPTH EVALUATING METHOD THEREOF

CROSS-REFERENCE TO RELATED APPLICATIONS

This application is a continuation of international PCT application serial no. PCT/CN2020/101026, filed on Jul. 9, 2020, which claims the priority benefit of China application no. 202010603014.8, filed on Jun. 29, 2020. The entirety of each of the above-mentioned patent applications is hereby incorporated by reference herein and made a part of this specification.

FIELD OF TECHNOLOGY

The present invention relates to the technical field of electronic monitoring control and evaluation, in particular to a system for bridge scour multi-source monitoring, a monitoring method thereof and a scour depth evaluating method thereof.

BACKGROUND

Bridges as lifeline engineering need to withstand various natural disasters. Among many bridge disaster-causing factors, foundation scour is one of the main reasons for bridge damage; and scour is a natural phenomenon caused by the hydrodynamic action of a water flow on an erodible riverbed. The scour on the bridges lightly affects the beauty of the bridges and the comfort of driving, and seriously causes the damage to the bridges. The National Transportation Safety Board counted 1,502 collapsed bridges from 1966 to 2005, and found that 58% of the damage was caused by bridge foundation scour and related hydraulic actions. In recent years, a large number of bridges constructed in China are in the water flow scour environment, and the problem of foundation scour has become increasingly prominent. In particular, large cross-sea bridges are in a relatively harsh marine environment, and have a certain degree of scour and deposition changes due to the influences of wave flow, typhoon and other scour conditions. It is more difficult to monitor local scour and evaluate the scour depth of a pile foundation. The foundation scour phenomenon of several existing cross-sea bridges in China has exceeded the expected situation. Development of effective scour depth monitoring and scour depth evaluation on bridge foundations has become a current urgent problem for researchers, engineers and bridge management departments.

A bridge foundation scour depth monitoring method can intuitively obtain the foundation scour situation, and provide guiding suggestions for the implementation of actual bridge scour protection measures, avoiding bridge damage by water. At present, a traditional detection method for bridge foundation scour in China is manual underwater operation detection, but underwater operation seriously threatens the life safety of testers, and the detection accuracy depends on the experience of testers. Through development of research of monitoring foundation scour of medium and small span bridges, many monitoring methods have been created, such as a buoyancy monitor, a magnetic sliding ring, a sonar, a radar and a time-domain reflectometer (TDR). However, various monitoring methods have the disadvantages of low accuracy, limited application scope, poor economy and being unable to monitor scour situations in real time due to influences of factors such as a water flow, nonlinear motion of a surveying vessel, the experience of measuring personnel and a complex monitoring service environment. Silt scour and deposition on seabed where cross-sea bridges located are complex and changeable, and sea floor trenches change and develop rapidly. At present, there are few foundation scour monitoring methods used in large-scale cross-sea bridges. Silt scour and deposition has a lag effect relative to the change of tidal flow velocity, and there are shortcomings in monitoring scour and back-silting situations of muddy soil. This urgently requires people to find new bridge foundation scour monitoring methods to make up for the shortcomings of previous methods. It has positive social significance to improve the accuracy and work efficiency of scour monitoring, and accurately evaluate the scour depth of bridge pile foundations to identify the safety status of the bridges, and timely take effective bridge protection measures for bridge management departments to ensure the safe operation of the bridges.

SUMMARY

Aiming at the problems in the prior art, the present invention provides a system for bridge scour multi-source monitoring, a monitoring method thereof and a scour depth evaluating method thereof. This system mainly self-adaptively controls work of a monitoring device under triggering of different environmental conditions to carry out real-time dynamic acquisition and transmission on multi-source monitoring data, and safety statuses of pile foundations of large bridges can be quickly and accurately judged through the scour depth evaluating method based on multi-source fusion and bridge dynamic deflection values, so as to provide bases for bridge maintenance and safe operation.

The technical solution of the present invention is as follows:

A system for bridge scour multi-source monitoring is characterized by including an intelligent monitoring system, a data industrial personal computer, a 5G remote communication transmission system and a remote scour depth evaluation center.

The intelligent monitoring system consists of three subsystems comprising a high-frequency real-time bridge dynamic characteristic monitoring system, an adjustable sound velocity underwater depth monitoring system, and a scoured seabed soil pressure change testing system, and the three subsystems can be coupled with one another to carry out triggering control to acquire lateral pile data, thereby forming multi-source monitoring data, sensing and monitoring local scour of a bridge in real time, and realizing integration of clock synchronization, dynamic control of scour environment conditions, contact sensors and non-contact sensors.

The data industrial personal computer and the 5G remote communication system are installed at a pile top, and can carry out broken-point continuingly-transferring on the multi-source monitoring data obtained from the intelligent monitoring system through 5G communication to realize remote data transmission, and the data stored in the bridge data industrial personal computer can be remotely re-accessed.

The remote scour depth evaluation center obtains the multi-source monitoring data from the intelligent monitoring system and evaluates a local scour depth of a pile foundation through fusion on the multi-source monitoring data and a weight normalization algorithm.

The system for bridge scour multi-source monitoring is characterized in that the high-frequency real-time bridge dynamic characteristic monitoring system adopts a combination of high-frequency dynamic bidirectional acceleration sensors and dynamic strain sensors, the high-frequency dynamic bidirectional acceleration sensors are installed on the pile top and the pile cap, the dynamic strain sensors are installed on surfaces of the top and bottom of the pile, wherein bidirectional acceleration directions of the high-frequency dynamic bidirectional acceleration sensors are set as that: x is a direction of a water flow, and y is a direction perpendicular to the water flow, so as to realize dynamic response monitoring of a bridge structure.

The system for bridge scour multi-source monitoring is characterized in that the adjustable sound velocity underwater depth monitoring system adopts a single beam echo sounder, a transducer of the single beam echo sounder is installed on a stainless hoop through a stainless rod part and is kept being perpendicularly arranged below a water surface, and the stainless hoop is installed on a pile surface at the lowest tidal level in recent years.

The system for bridge scour multi-source monitoring is characterized in that the scoured seabed soil pressure change testing system integrates a pressure sensor and a seepage pressure sensor, and the pressure sensor and the seepage pressure sensor are accurately lowered to a specified measuring point in front of a pile from near the pile.

The system for bridge scour multi-source monitoring is characterized in that the data industrial personal computer is connected with the intelligent monitoring system and a power case through wires to control the parameter setting of multi-source sensors to realize consecutive storage and chunking call of bridge scour sensing data links, and the broken-point continuingly-transferring is carried out through the 5G remote communication system to transfer the monitoring data to the remote scour depth evaluation center.

A monitoring method of the system for bridge scour multi-source monitoring is characterized by including the following steps.

1) Under an ordinary weather environment:
1.1) Install the seepage pressure sensor on the pile surface at the stainless hoop, wherein the seepage pressure sensor operates in real time, data are uploaded to the data industrial personal computer through wires, the data industrial personal computer obtains real-time tidal level data through a preset algorithm, then controls turning on and off of the single beam echo sounder in accordance with whether or not the real-time tidal level data reach a set monitoring threshold, and sets a wave velocity in accordance with the propagation velocity of sound wave in an actual marine environment, so as to avoid affecting monitoring accuracy by systematic error caused by complicated and volatile external environment and long-time operation of the single beam echo sounder, and monitoring data of the single beam echo sounder shows the depth change of a scour interface at a bridge pile foundation measuring point.

Set an acquisition threshold h' of the single beam echo sounder, wherein the data industrial personal computer automatically controls the turning on and off of the single beam echo sounder through a tidal level elevation obtained by conversion of the seepage pressure sensor that is installed on the pile surface at the stainless hoop, a sounding sampling is carried out when the tidal level is greater than h', and the sounding sampling is stopped when the tidal level is less than h', so as to avoid affecting monitoring accuracy by accumulation of measuring error caused by long-time operation of the single beam echo sounder; in order to prevent the contingency of single data, when a considerable amount of measuring data reach h', turning on and off of the single beam echo sounder is automatically controlled; measuring data $h_{tr}$ of depths from a bottom surface of the transducer of the single beam echo sounder to a water bottom can show a change of a soil layer interface of an upstream side of the pile, and then the change $\Delta h_{tr}$ of a scour depth is obtained based on the difference of the depths, that are measured at different time, from the bottom surface of the transducer of the single beam echo sounder to the water bottom; and relevant calculation theory thereof is as follows:

$$h_1 = P_k/\gamma_1 - h_2$$
$$h_{tr} = \frac{1}{2}Ct$$

wherein $h_1$ is the tidal level elevation; $P_k$ is an actual measured data of the seepage pressure sensor on the pile surface at the stainless hoop; $\gamma_1$ is the volume weight of seawater; $h_2$ is a distance from the seepage pressure sensor on the pile surface at the stainless hoop to a datum plane of the tidal level; $h_{tr}$ is a distance from a bottom of the transducer of the single beam echo sounder to a seabed surface; C is an actual average sound velocity of the seawater; and t is two-way time of the sound waves.

1.2) Set an amplitude of change of depths of the single beam echo sounder, wherein when sounding data reaches the amplitude of change, the data industrial personal computer carries out automatic control to turn on the high-frequency real-time bridge dynamic characteristic monitoring system and the scoured seabed soil pressure change testing system to make the three subsystems operate normally, so as to obtain clock-synchronous real-time monitoring data of the three subsystems.

Set sampling frequencies of the pressure sensor and the seepage pressure sensor in the scoured seabed soil pressure change testing system, and average the pressure data $P_2$ and $P_3$ thereof, wherein data acquired by the pressure sensor includes soil layer pressure values and water pressure values, and data acquired by the seepage pressure sensor only includes water pressure values, namely, a silt scour or back-silting pressure value $\Delta P$ can be reflected by a value difference between the pressure sensor and the seepage pressure sensor; and the seabed soil effective unit weight $\gamma_2$ is measured by carrying out drilling sampling on a seabed bearing stratum, namely, a silt scour or back-silting thickness $h_3$ on a lateral pile soil pressure monitoring system can be obtained;

$$P_2 = \frac{1}{n}\sum_{i=1}^{n} P_i, \quad P_3 = \frac{1}{n}\sum_{j=1}^{n} P_j$$
$$\Delta P = P_2 - P_3$$
$$h_3 = \frac{\Delta P}{\gamma_2}$$

wherein $P_i$ is an actual measured data of the pressure sensor in the scoured seabed soil pressure change testing system, i is actual measured data points of the pressure sensor at different time, n is a number of data, $P_j$ is an actual measured data of the seepage pressure sensor in the scoured seabed soil pressure change testing system, and j is actual measured data points of the seepage pressure sensor at different time.

When an interface of the seabed bearing stratum changes, judge whether or not an absolute position of a system device changes by further analyzing the scoured seabed soil pressure change testing system and the seepage pressure sensor on the pile surface at the stainless hoop, and then comprehensively judge a change of a scour depth by considering the silt scour or back-silting situation:

$$P_1 = \frac{1}{n}\sum_{k=1}^{n} P_k$$

$$h_4 = (P_3 - P_1)/\gamma_1$$

wherein $h_4$ is a depth from the scoured seabed soil pressure change testing system to the seepage pressure sensor on the pile surface at the stainless hoop; $P_k$ is an actual measured data of the seepage pressure sensor on the pile surface at the stainless hoop, n is a number of data points, and k is actual measured data points of the seepage pressure sensor on the pile surface at the stainless hoop at different time; and $P_1$ is an average value of seepage pressures monitored by the seepage pressure sensor on the pile surface at the stainless hoop.

1.3) Carry out high-frequency dynamic monitoring on acceleration data of the pile top and the pile cap as well as dynamic strain data of the top and bottom of the pile by the high-frequency real-time bridge dynamic characteristic monitoring system, acquire acceleration signals under action of earth pulsation, and carry out spectral analysis on the signals to obtain structural natural vibration frequency information contained in response signals; carry out modeling and grid dividing on a bridge model based on ANSYS finite element software, and simulate pile-soil interaction by setting spring units in the ANSYS finite element software, wherein the spring stiffness K is determined by an m method, and a value model is modified by combining a scour depth obtained by manual underwater exploration in an installation day with the actual measured acceleration data for the installation day to establish a benchmark numerical model; stimulating different scour depths of the bridge with the benchmark numerical model by deleting spring units at different depths to obtain natural vibration frequencies under different scour depth working conditions; carrying out manual neural network training on partial natural vibration frequency results and corresponding scour depths obtained through stimulation, and carrying out checking with the rest of the natural vibration frequency results to ensure the accuracy of a network model, wherein the grid model selects a natural vibration frequency sensitive order as a network input parameter, and an output parameter is the scour depth; inputting corresponding natural vibration frequencies identified by the actual measured acceleration data of the pile top and the pile cap into the manual neural network, thereby obtaining bridge scour depth values; and conversing the dynamic strain data into dynamic deflection data of the pile to evaluate bridge operation safety statuses by adopting a strain-curvature-deflection relationship through a curvature function-based method.

2) Under a rugged environment:

2.1) Carry out control to simultaneously turn on the three subsystems of the intelligent monitoring system by the data industrial personal computer to realize dynamic online operation of the three subsystems so as to obtain clock-synchronous real-time monitoring data of the three subsystems, obtain sounding data of the single beam echo sounder in the adjustable sound velocity underwater depth monitoring system according to the step 1.1), obtain pressure and seepage pressure data in the scoured seabed soil pressure change testing system according to the step 1.2), and obtain acceleration data and dynamic strain data according to the high-frequency real-time bridge dynamic characteristic monitoring system in the step 1.3), thereby obtain scour depths through respective conversion of the high-frequency real-time bridge dynamic characteristic monitoring system, the adjustable sound velocity underwater depth monitoring system and the scoured seabed soil pressure change testing system.

A scour depth evaluating method of the system for bridge scour multi-source monitoring is characterized by including the following steps:

Carry out dynamic weight selection in consideration of an analytic hierarchy process to select dynamic weight of the intelligent monitoring system as a target hierarchy, take a water flow velocity, a water depth, a silt grain size, a suspended matter concentration, an environmental vibration magnitude and an external scour environment as a criterion hierarchy, and take the three subsystems of the intelligent monitoring system as a project hierarchy so as to form a structural model for multi-hierarchy intelligent monitoring system dynamic weight selection, construct a judgment matrix and carrying out the steps of single hierarchical arrangement and consistency check thereof as well as total hierarchical arrangement and consistency check thereof, and carry out real-time analysis on dynamic weight selection of the intelligent monitoring system for bridge pile foundation scour to obtain dynamic weights $\lambda_1$, $\lambda_2$, $\lambda_3$ of the high-frequency real-time bridge dynamic characteristic monitoring system, the adjustable sound velocity underwater depth monitoring system and the scoured seabed soil pressure change testing system, wherein since all the monitoring data of the three subsystems are finally conversed into scour depth values, all the weights are normalized according to the following formulas:

$$a_1 = \lambda_1/(\lambda_1 + \lambda_2 + \lambda_3)$$

$$a_2 = \lambda_2/(\lambda_1 + \lambda_2 + \lambda_3)$$

$$a_3 = \lambda_3/(\lambda_1 + \lambda_2 + \lambda_3)$$

Carry out multi-source data fusion on actual bridge scour depths in accordance with the result of weight normalization:

$$y_b = a_1 y_1 + a_2 y_2 + a_3 y_3$$

wherein $y_b$ is a scour depth through multi-source monitoring data fusion, $a_1$, $a_2$, $a_3$ are normalized dynamic values of the high-frequency real-time bridge dynamic characteristic monitoring system, the adjustable sound velocity underwater depth monitoring system and the scoured seabed soil pressure change testing system, and $y_1$, $y_2$, $y_3$ are scour depths obtained through respective conversion of the high-frequency real-time bridge dynamic characteristic monitoring system, the adjustable sound velocity underwater depth monitoring system and the scoured seabed soil pressure change testing system.

The present invention has the beneficial effects as follows: the present patent develops a system for bridge scour multi-source monitoring, which carries out dynamic acquisition on monitoring data and carries out broken-point continuingly-transferring through 5G communication mainly by a multi-source intelligent monitoring system, thereby providing a new method for bridge scour depth monitoring; the complexity of marine service conditions is taken into consideration, so that the present invention can adapt to the harsh marine environment, make up for the single underwater monitoring means, improve the durability of the sensors, overcome the shortcomings such as the low monitoring accuracy, and intermittently carry out real-time monitoring on bridge foundation scour situations in a remote control mode, thereby being capable of effectively saving energy, and quickly determining the safety status of the pile foundation; in view of the characteristics of static monitoring for scour in the past, the invented system performs timing control sampling on scour environmental conditions to realize marine dynamic real-time monitoring, and realize clock synchronization of the multi-source monitoring data; and through the bridge pile foundation scour depth evaluating method based on multi-source monitoring data, the safety of pile foundation scour is evaluated in real time and quickly to ensure safe operation of the bridge, so as to achieve significant social and economic benefits.

BRIEF DESCRIPTION OF THE DRAWINGS

In FIGS. 1—5G remote communication transmission system, 2—Data industrial personal computer, 3—High-frequency dynamic bidirectional acceleration sensor, 4—Wire, 5—Stainless rod part, 6—Hoop, 7—Adjustable sound velocity underwater depth monitoring system, 8—Scoured seabed soil pressure change testing system, 9—Seepage pressure sensor, 10—Pile cap, 11—Pile, 12—Dynamic strain sensor.

DESCRIPTION OF THE EMBODIMENTS

Figure 1:
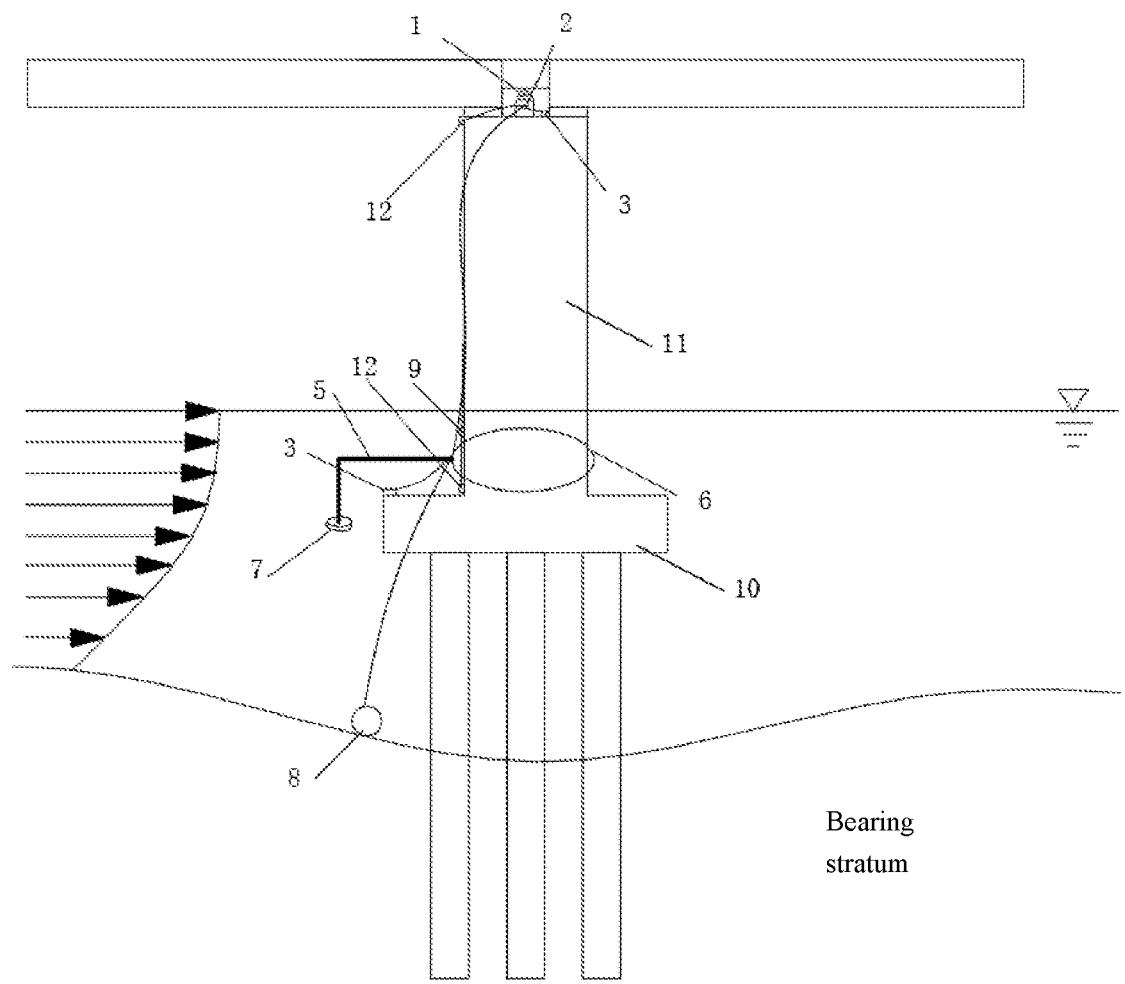
FIG. 1 is a schematic diagram of a bridge system of the present invention.
Figure 2:
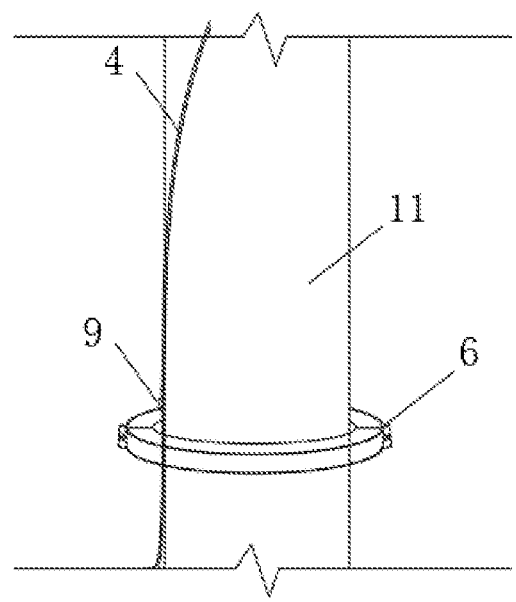
FIG. 2 is a schematic diagram of hoop installation of the present invention.
Figure 3:
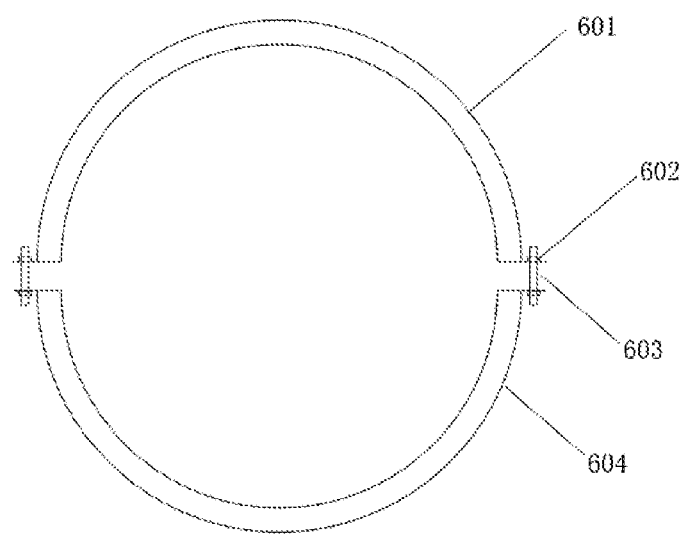
FIG. 3 is a schematic diagram of a hoop structure of the present invention.
Figure 4:
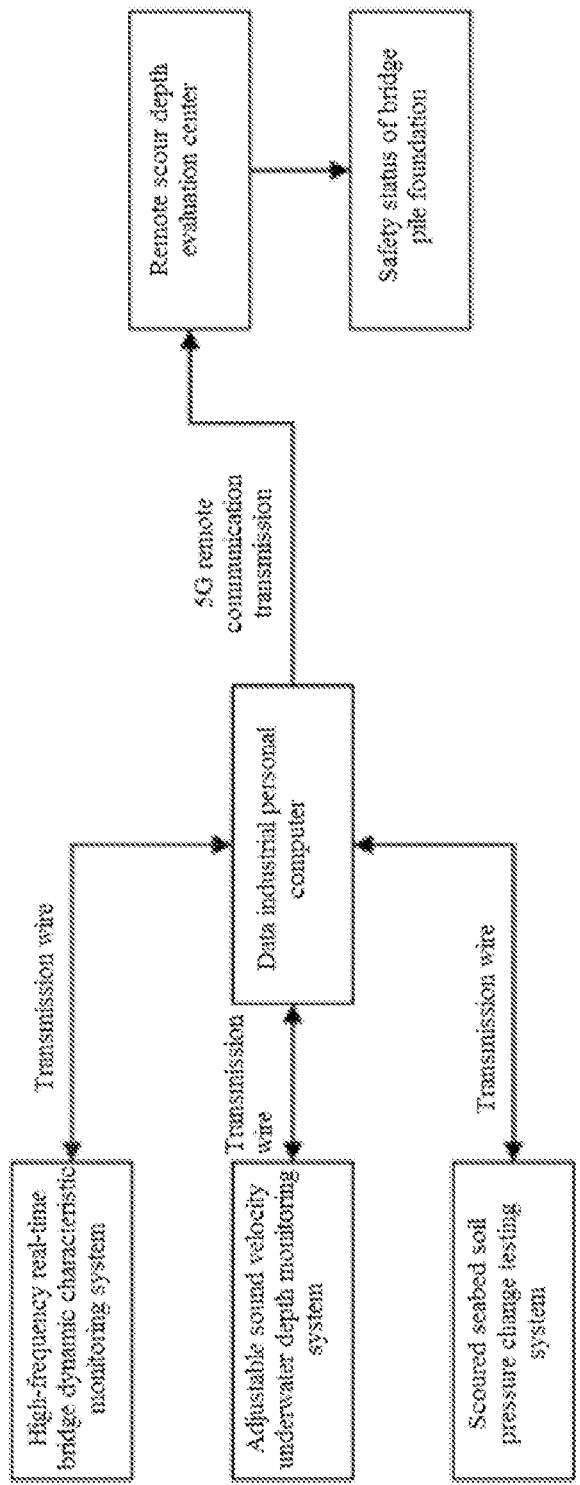
FIG. 4 is a diagram of a system module of the present invention.
Figure 5:
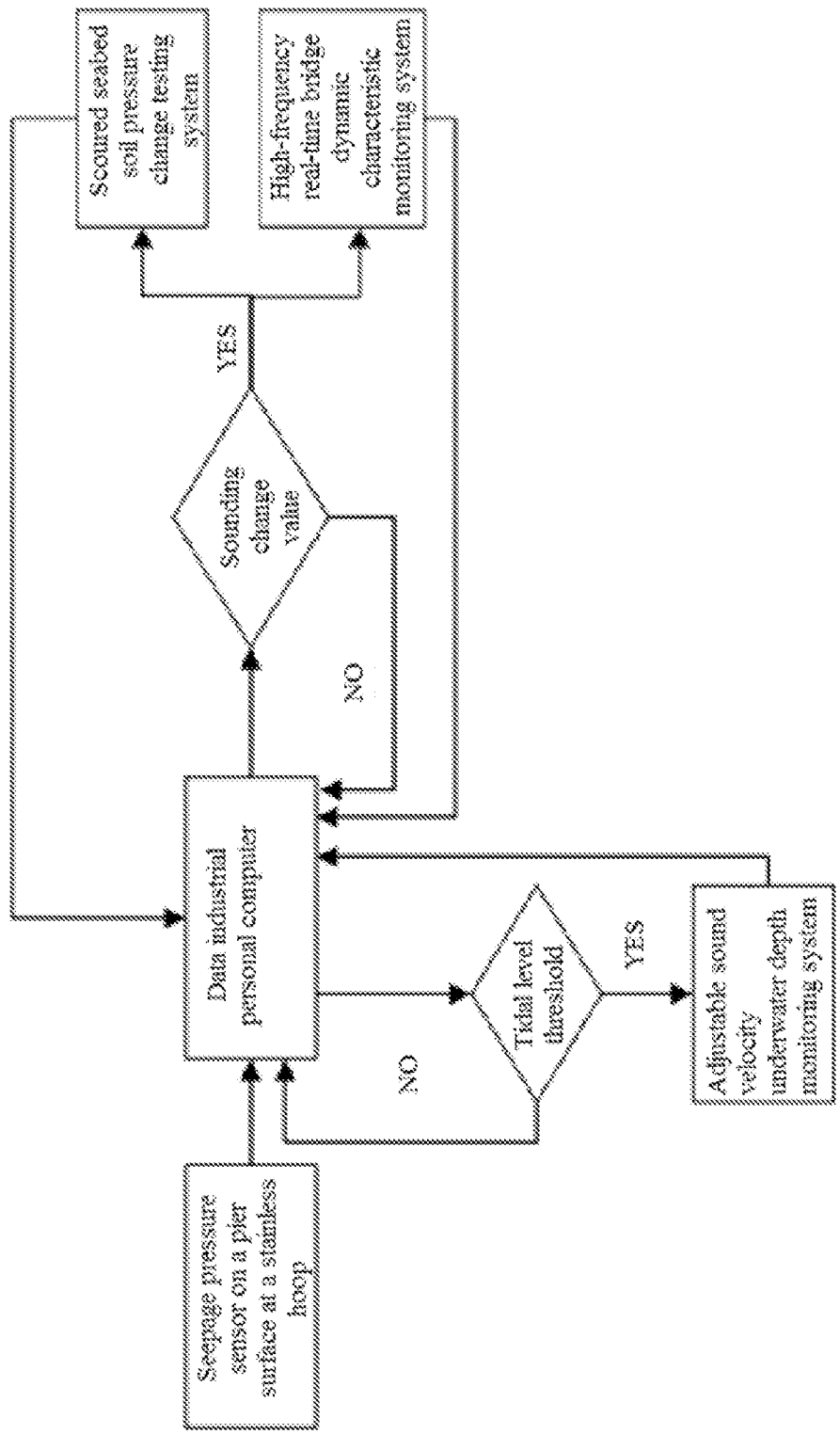
FIG. 5 is a diagram of a control module of the present invention.

The present invention is further described below in combination with the accompanying drawings of the specification.

As shown in FIGS. 1-6, a system for bridge scour multi-source monitoring includes an intelligent monitoring system, a data industrial personal computer, a 5G remote communication transmission system and a remote scour depth evaluation center.

The intelligent monitoring system consists of three monitoring subsystems comprising a high-frequency real-time bridge dynamic characteristic monitoring system, an adjustable sound velocity underwater depth monitoring system, and a scoured seabed soil pressure change testing system (this equipment has been disclosed in Patent Number 2018104740925 entitled "Monitoring Method Based On Safety Monitoring Device For Cubic Bridge Foundation Scour"), and the three subsystems can be coupled with one another to carry out triggering control to acquire lateral pile data, thereby forming a multi-source bridge local scour real-time sensing and monitoring system, and realizing integration of clock synchronization, dynamic control of scour environment conditions, contact sensors and non-contact sensors.

The data industrial personal computer and the 5G remote communication system are installed at a pile top, and can carry out broken-point continuingly-transferring on multi-source monitoring data obtained from sensors through 5G communication to realize remote data transmission, and the data stored in the bridge data industrial personal computer can be remotely re-accessed by data analysis personnel; and in the present embodiment, the 5G remote communication system comprises a 5G industrial module, antennas and a 5G access-internet card, wherein the model number of the 5G industrial module is HUAWEI MH5000-31p, and the 5G industrial module is integrated onto the data industrial personal computer 2.

The remote scour depth evaluation center obtains real-time monitoring data of local scour situations of a monitored bridge pile foundation, and a structural scour depth evaluating method for local scour of a pile foundation is researched and developed through fusion of multi-source monitoring data and a weight normalization algorithm; and in the present embodiment, the remote scour depth evaluation center is a remote server.

The adjustable sound velocity underwater depth monitoring system adopts a single beam echo sounder. A sound velocity of the single beam echo sounder can be set according to a sound wave transmission rate in a marine actual deep-water environment, so as to improve monitoring accuracy. Turning on and off of monitoring of the single beam echo sounder are self-adaptively controlled through a change of a tidal level in water, so as to overcome the shortcoming that the single beam echo sounder cannot work continuously. Mainly, a transducer of the single beam echo sounder is installed (welded) on a stainless hoop by arranging an L-shaped stainless rod part (the transducer is fixed by waterproof adhesive tape, and bound by a metal band), and is kept being always perpendicular below a water surface, and is distant to a pile surface for a certain distance. The stainless hoop is installed on the pile surface at the lowest tidal level in recent years (in recent 10 years); and in the present embodiment, the stainless hoop 6 comprises a first hoop 601, a second hoop 604, nuts 602 and double-threaded screws 603, and the first hoop 601 and the second hoop 604 are fixedly connected through the nuts 602 and the double-threaded screws 603.

The high-frequency real-time bridge dynamic characteristic monitoring system mainly adopts a combination of high-frequency dynamic bidirectional acceleration sensors and dynamic strain sensors, the high-frequency dynamic bidirectional acceleration sensors are installed on the pile top and a pile cap, and the dynamic strain sensors are installed on surfaces of the top and bottom of the pile, wherein bidirectional acceleration directions are set as that: x is a direction of a water flow, and y is a direction perpendicular to the water flow, so as to realize dynamic response monitoring of a bridge structure. The scoured seabed soil pressure change testing system mainly integrates a pressure sensor and a seepage pressure sensor, and the pressure sensor and the seepage pressure sensor are accurately lowered to a specified measuring point in front of a pile from near the pile.

A monitoring method of a system for bridge scour multi-source monitoring has the specific steps as follows:
1) Under an ordinary weather environment (such as sunny weather and rainy weather):
1.1) The seepage pressure sensor installed on the pile surface at the stainless hoop operating in real time, wherein data are uploaded to the data industrial personal computer through wires, the data industrial personal computer obtains real-time tidal level data through a preset algorithm, then controls turning on and off of the single beam echo sounder in accordance with whether or not the real-time tidal level data reach a set monitoring threshold, and sets a wave velocity in accordance with the propagation velocity of sound wave in an actual marine environment, so as to avoid affecting monitoring accuracy by systematic error caused by complicated and volatile external environment and long-time operation of the single beam echo sounder, and monitoring data of the single beam echo sounder shows the depth change of a scour interface at a bridge pile foundation measuring point.

Set an acquisition threshold h' of the single beam echo sounder, wherein a monitoring center automatically controls the turning on and off of the single beam echo sounder through a tidal level elevation obtained by conversion of the seepage pressure sensor that is installed on the pile surface at the stainless hoop, a sounding sampling is carried out when the tidal level is greater than h', and the sounding sampling is stopped when the tidal level is less than h', so as to avoid affecting monitoring accuracy by accumulation of measuring error caused by long-time operation of the single beam echo sounder; in order to prevent the contingency of single data, when a considerable amount of measuring data reach h', turning on and off of the single beam echo sounder can be automatically controlled; measuring data $h_{tr}$ of depths from a bottom surface of the transducer of the single beam echo sounder to a water bottom can show a change of a soil layer interface of an upstream side of the pile, and then the change $\Delta h_{tr}$ of a scour depth can be obtained based on the difference of the depths, that are measured at different time, from the bottom surface of the transducer of the single beam echo sounder to the water bottom; and relevant calculation theory thereof is as follows:

$$h_1 = P_k / \gamma_1 - h_2$$
$$h_{tr} = \frac{1}{2} Ct$$

wherein $h_1$ is the tidal level elevation; $P_k$ is an actual measured data of the seepage pressure sensor on the pile surface at the stainless hoop; $\gamma_1$ is the volume weight of seawater; $h_2$ is a distance from the seepage pressure sensor on the pile surface at the stainless hoop to a datum plane of the tidal level; $h_{tr}$ is a distance from a bottom of the transducer of the single beam echo sounder to a seabed surface; C is an actual average sound velocity of the seawater; and t is two-way time of the sound waves.

1.2) Set an amplitude of change of depths of the single beam echo sounder, wherein when sounding data reaches the amplitude of change, the data industrial personal computer carries out automatic control to turn on the high-frequency real-time bridge dynamic characteristic monitoring system and the scoured seabed soil pressure change testing system to make the three subsystems operate normally, so as to obtain clock-synchronous real-time monitoring data of the three subsystems.

Set sampling frequencies of the pressure sensor and the seepage pressure sensor in the scoured seabed soil pressure change testing system, and average pressure data $P_2$ and $P_3$ thereof, wherein data acquired by the pressure sensor includes soil layer pressure and water pressure values, and data acquired by the seepage pressure sensor only includes water pressure values, namely, a silt scour or back-silting pressure value $\Delta P$ can be reflected by a value difference between the pressure sensor and the seepage pressure sensor; and the seabed soil effective unit weight $\gamma_2$ is measured by carrying out drilling sampling on a seabed bearing stratum, namely, a silt scour or back-silting thickness $h_3$ on a lateral pile soil pressure monitoring system can be obtained:

$$P_2 = \frac{1}{n}\sum_{i=1}^{n} P_i, P_3 = \frac{1}{n}\sum_{j=1}^{n} P_j$$
$$\Delta P = P_2 - P_3$$
$$h_3 = \frac{\Delta P}{\gamma_2}$$

wherein $P_i$ is an actual measured data of the pressure sensor in the scoured seabed soil pressure change testing system, i is actual measured data points of the pressure sensor at different time, n is a number of data, $P_j$ is an actual measured data of the seepage pressure sensor in the scoured seabed soil pressure change testing system, and j is actual measured data points of the seepage pressure sensor at different time.

When an interface of the seabed bearing stratum changes, be capable of judging whether or not an absolute position of a system device changes by further analyzing the scoured seabed soil pressure change testing system and the seepage pressure sensor on the pile surface at the stainless hoop, and then being capable of comprehensively judging a change of a scour depth by considering the silt scour or back-silting situation;

$$P_1 = \frac{1}{n}\sum_{k=1}^{n} P_k$$
$$h_4 = (P_3 - P_1)/\gamma_1$$

wherein $h_4$ is a depth from the scoured seabed soil pressure change testing system to the seepage pressure sensor on the pile surface at the stainless hoop; $P_k$ is an actual measured data of the seepage pressure sensor on the pile surface at the stainless hoop, n is a number of data points, and k is actual measured data points of the seepage pressure sensor on the pile surface at the stainless hoop at different time; and $P_1$ is an average value of seepage pressures monitored by the seepage pressure sensor on the pile surface at the stainless hoop.

1.3) Carry out high-frequency dynamic monitoring on acceleration data of the pile top and the pile cap as well as dynamic strain data of the top and bottom of the pile by the high-frequency real-time bridge dynamic characteristic monitoring system, acquire signals of acceleration under action of earth pulsation, and carry out spectral analysis on the signals to obtain structural natural vibration frequency information contained in response signals; carry out modeling and grid dividing on a bridge model based on ANSYS finite element software, and simulate pile-soil interaction by setting spring units in the ANSYS finite element software, wherein the spring stiffness K is determined by an m method (calculating pile foundation soil spring stiffness K by an m method in Appendix L according to Code for Design of Ground Base and Foundation of Highway Bridges and Culverts (JTG 3363-2019)), and a value model is modified by combining a scour depth obtained by manual underwater exploration in an installation day with the actual measured acceleration data for the installation day to establish a benchmark numerical model; stimulating different scour depths of the bridge with the benchmark numerical model by deleting spring units at different depths to obtain natural vibration frequencies under different scour depth working conditions; carrying out manual neural network training on partial natural vibration frequency results and corresponding scour depths obtained through stimulation, and carrying out checking with the rest of the results to ensure the accuracy of a network model, wherein the grid model selects a natural vibration frequency sensitive order (natural vibration frequency orders greatly affected by the scour depth) as a network input parameter, and an output parameter is the scour depth; inputting corresponding natural vibration frequencies identified by the actual measured acceleration data of the pile top and the pile cap into the manual neural network, thereby obtaining bridge scour depth values; and conversing the dynamic strain data into dynamic deflection data of the pile to evaluate bridge operation safety statuses by adopting a strain-curvature-deflection relationship through a curvature function-based method.

2) Under a rugged environment (such as a spring tide phase, typhoon, and storm surge):

2.1) carry out control to simultaneously turn on the three subsystems by the data industrial personal computer to realize dynamic online operation of the three subsystems so as to obtain clock-synchronous real-time monitoring data of the three monitoring subsystems, obtain sounding data of the single beam echo sounder in the adjustable sound velocity underwater depth monitoring system according to the step 1.1), obtain pressure and seepage pressure data in the scoured seabed soil pressure change testing system according to the step 1.2), and obtain acceleration data and dynamic strain data according to the high-frequency real-time bridge dynamic characteristic monitoring system in the step 1.3), thereby obtain scour depths through respective conversion of the high-frequency real-time bridge dynamic characteristic monitoring system, the adjustable sound velocity underwater depth monitoring system and the scoured seabed soil pressure change testing system.

Figure 6:
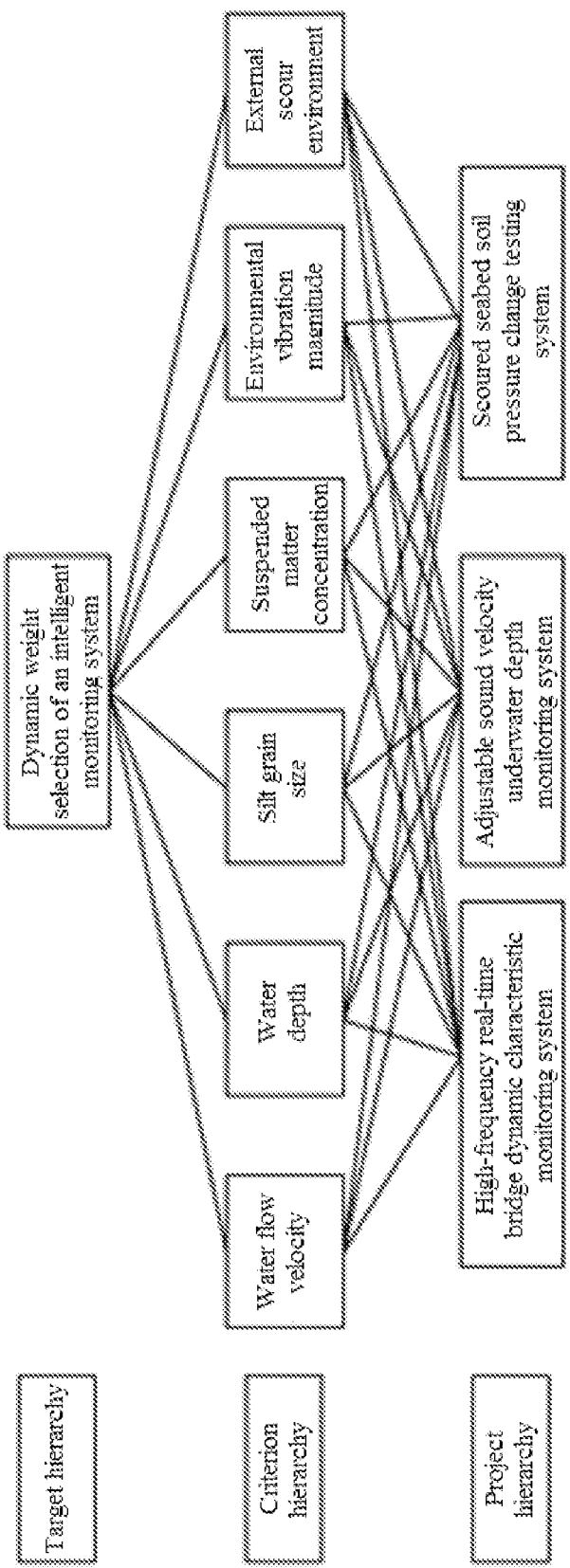
FIG. 6 is a diagram of a dynamic weight selection method of the present invention.

A scour depth evaluating method of a system for bridge scour multi-source monitoring has the specific steps as follows:

As shown in FIG. 6, carry out dynamic weight selection in consideration of an analytic hierarchy process to select dynamic weight of the intelligent monitoring system as a target hierarchy, take a water flow velocity, a water depth, a silt grain size, a suspended matter concentration, an environmental vibration magnitude and an external scour environment (such as ordinary weather, typhoon, a spring tide phase, storm surge, etc.) as a criterion hierarchy, and take the three subsystems of the intelligent monitoring system as a project hierarchy so as to form a structural model for multi-hierarchy intelligent monitoring system dynamic weight selection, constructing a judgment (paired comparison) matrix and carrying out the steps of single hierarchical arrangement and consistency check thereof as well as total hierarchical arrangement and consistency check thereof, and carrying out real-time analysis on dynamic weight selection of the intelligent monitoring system for bridge pile foundation scour to obtain dynamic weights $\lambda_1$, $\lambda_2$, $\lambda_3$ of the high-frequency dynamic bridge pile foundation dynamic characteristic monitoring system, the adjustable sound velocity underwater depth monitoring system and the scoured seabed soil pressure change testing system under specified conditions, wherein since all the monitoring data of the three subsystems are finally conversed into scour depth values, all the weights are normalized according to the following formulas:

$$a_1 = \lambda_1 / (\lambda_1 + \lambda_2 + \lambda_3)$$
$$a_2 = \lambda_2 / (\lambda_1 + \lambda_2 + \lambda_3)$$
$$a_3 = \lambda_3 / (\lambda_1 + \lambda_2 + \lambda_3)$$

Carry out multi-source data fusion on actual bridge scour depths in accordance with the result of weight normalization:

$$y_b = a_1 y_1 + a_2 y_2 + a_3 y_3$$

wherein $y_b$ is a scour depth under multi-source monitoring data fusion (the greater a value of $y_b$ is, the greater the scour depth is), $a_1$, $a_2$, $a_3$ are normalized dynamic values of the high-frequency real-time bridge dynamic characteristic monitoring system, the adjustable sound velocity underwater depth monitoring system and the scoured seabed soil pressure change testing system, and $y_1$, $y_2$, $y_3$ are scour depths obtained through respective conversion of the high-frequency real-time bridge pile foundation dynamic characteristic monitoring system, the adjustable sound velocity underwater depth monitoring system and the scoured seabed soil pressure change testing system.

What is claimed is:

1. A system for bridge scour multi-source monitoring, comprising:
    an intelligent monitoring system;
    a data industrial personal computer;
    a 5G remote communication transmission system; and
    a remote scour depth evaluation center,
    wherein the intelligent monitoring system consists of three subsystems comprising a high-frequency real-time bridge dynamic characteristic monitoring system, an adjustable sound velocity underwater depth monitoring system, and a scoured seabed soil pressure change testing system, and the three subsystems are coupled with one another to carry out triggering control to acquire lateral pile data, thereby forming multi-source monitoring data, sensing and monitoring local scour of a bridge in real time, and realizing integration of clock synchronization, dynamic control of scour environment conditions, contact sensors and non-contact sensors;
    the data industrial personal computer and the 5G remote communication system are installed at a pile top and carry out broken-point continuingly-transferring on the multi-source monitoring data obtained from the intelligent monitoring system through 5G communication to realize remote data transmission, and the data stored in the bridge data industrial personal computer is remotely re-accessed;
    the remote scour depth evaluation center obtains the multi-source monitoring data from the intelligent monitoring system and evaluates a local scour depth of a pile foundation through fusion on the multi-source monitoring data and a weight normalization algorithm.

2. The system for bridge scour multi-source monitoring according to claim 1, wherein the high-frequency real-time bridge dynamic characteristic monitoring system adopts a combination of high-frequency dynamic bidirectional acceleration sensors and dynamic strain sensors, the high-frequency dynamic bidirectional acceleration sensors are installed on the pile top and a pile cap, the dynamic strain sensors are installed on surfaces of the top and bottom of the pile, wherein bidirectional acceleration directions of the high-frequency dynamic bidirectional acceleration sensors are set as that: x is a direction of a water flow, and y is a direction perpendicular to the water flow, so as to realize dynamic response monitoring of a bridge structure.

3. The system for bridge scour multi-source monitoring according to claim 1, wherein the adjustable sound velocity underwater depth monitoring system adopts a single beam echo sounder, a transducer of the single beam echo sounder is installed on a stainless hoop through a stainless rod part and is kept being perpendicularly arranged below a water surface, and the stainless hoop is installed on a pile surface at the lowest tidal level in recent years.

4. The system for bridge scour multi-source monitoring according to claim 1, wherein the scoured seabed soil pressure change testing system integrates a pressure sensor and a seepage pressure sensor, and the pressure sensor and the seepage pressure sensor are accurately lowered to a specified measuring point in front of a pile from near the pile.

5. The system for bridge scour multi-source monitoring according to claim 1, wherein the data industrial personal computer is connected with the intelligent monitoring system and a power case through wires to control the parameter setting of multi-source sensors to realize consecutive storage and chunking call of bridge scour sensing data links, and the broken-point continuingly-transferring is carried out through the 5G remote communication system to transfer the monitoring data to the remote scour depth evaluation center.

6. A monitoring method of the system for bridge scour multi-source monitoring according to claim 1, comprising the following steps:
1) under an ordinary weather environment:
1.1) installing the seepage pressure sensor on the pile surface at the stainless hoop, wherein the seepage pressure sensor operates in real time, data are uploaded to the data industrial personal computer through wires, the data industrial personal computer obtains real-time tidal level data through a preset algorithm, then controls turning on and off of the single beam echo sounder in accordance with whether or not the real-time tidal level data reach a set monitoring threshold, and sets a wave velocity in accordance with the propagation velocity of sound wave in an actual marine environment, so as to avoid affecting monitoring accuracy by systematic error caused by complicated and volatile external environment and long-time operation of the single beam echo sounder, and monitoring data of the single beam echo sounder shows the depth change of a scour interface at a bridge pile foundation measuring point;

setting an acquisition threshold h' of the single beam echo sounder, wherein the data industrial personal computer automatically controls the turning on and off of the single beam echo sounder through a tidal level elevation obtained by conversion of the seepage pressure sensor that is installed on the pile surface at the stainless hoop, a sounding sampling is carried out when the tidal level is greater than h', and the sounding sampling is stopped when the tidal level is less than h', so as to avoid affecting monitoring accuracy by accumulation of measuring error caused by long-time operation of the single beam echo sounder; in order to prevent the contingency of single data, when a considerable amount of measuring data reach h', turning on and off of the single beam echo sounder is automatically controlled; measuring data $h_{tr}$ of depths from a bottom surface of the transducer of the single beam echo sounder to a water bottom shows a change of a soil layer interface of an upstream side of the pile, and then the change $\Delta h_{tr}$ of a scour depth is obtained based on the difference of the depths, that are measured at different time, from the bottom surface of the transducer of the single beam echo sounder to the water bottom; and relevant calculation theory thereof is as follows:

$$h_1 = P_k / \gamma_1 - h_2$$

$$h_{tr} = \frac{1}{2} Ct$$

wherein $h_1$ is the tidal level elevation; $P_k$ is an actual measured data of the seepage pressure sensor on the pile surface at the stainless hoop; $\gamma_1$ is the volume weight of seawater; $h_2$ is a distance from the seepage pressure sensor on the pile surface at the stainless hoop to a datum plane of the tidal level; $h_{tr}$ is a distance from a bottom of the transducer of the single beam echo sounder to a seabed surface; C is an actual average sound velocity of the seawater; and t is two-way time of the sound waves;

1.2) setting an amplitude of change of depths of the single beam echo sounder, wherein when sounding data reaches the amplitude of change, the data industrial personal computer carries out automatic control to turn on the high-frequency real-time bridge dynamic characteristic monitoring system and the scoured seabed soil pressure change testing system to make the three subsystems operate normally, so as to obtain clock-synchronous real-time monitoring data of the three subsystems;

setting sampling frequencies of the pressure sensor and the seepage pressure sensor in the scoured seabed soil pressure change testing system, and averaging the pressure data $P_2$ and $P_3$ thereof, wherein data acquired by the pressure sensor includes soil layer pressure values and water pressure values, and data acquired by the seepage pressure sensor only includes water pressure values, namely, a silt scour or back-silting pressure value $\Delta P$ is reflected by a value difference between the pressure sensor and the seepage pressure sensor; and the seabed soil effective unit weight $\gamma_2$ is measured by carrying out drilling sampling on a seabed bearing stratum, namely, a silt scour or back-silting thickness $h_3$ on a lateral pile soil pressure monitoring system is obtained;

$$P_2 = \frac{1}{n} \sum_{i=1}^{n} P_i, \; P_3 = \frac{1}{n} \sum_{j=1}^{n} P_j$$

$$\Delta P = P_2 - P_3$$

$$h_3 = \frac{\Delta P}{\gamma_2}$$

wherein $P_i$ is an actual measured data of the pressure sensor in the scoured seabed soil pressure change testing system, i is actual measured data points of the pressure sensor at different time, n is a number of data, $P_j$ is an actual measured data of the seepage pressure sensor in the scoured seabed soil pressure change testing system, and j is actual measured data points of the seepage pressure sensor at different time;

when an interface of the seabed bearing stratum changes, judging whether or not an absolute position of a system device changes by further analyzing the scoured seabed soil pressure change testing system and the seepage pressure sensor on the pile surface at the stainless hoop, and then comprehensively judging a change of a scour depth by considering the silt scour or back-silting situation;

$$P_1 = \frac{1}{n}\sum_{k=1}^{n} P_k$$

$$h_4 = (P_3 - P_1)/\gamma_1$$

wherein $h_4$ is a depth from the scoured seabed soil pressure change testing system to the seepage pressure sensor on the pile surface at the stainless hoop; $P_k$ is an actual measured data of the seepage pressure sensor on the pile surface at the stainless hoop, n is a number of data points, and k is actual measured data points of the seepage pressure sensor on the pile surface at the stainless hoop at different time; and $P_1$ is an average value of seepage pressures monitored by the seepage pressure sensor on the pile surface at the stainless hoop;

1.3) carrying out high-frequency dynamic monitoring on acceleration data of the pile top and the pile cap as well as dynamic strain data of the top and bottom of the pile by the high-frequency real-time bridge dynamic characteristic monitoring system, acquiring acceleration signals under action of earth pulsation, and carrying out spectral analysis on the signals to obtain structural natural vibration frequency information contained in response signals; carrying out modeling and grid dividing on a bridge model based on ANSYS finite element software, and simulating pile-soil interaction by setting spring units in the ANSYS finite element software, wherein the spring stiffness K is determined by an m method, and a value model is modified by combining a scour depth obtained by manual underwater exploration in an installation day with the actual measured acceleration data for the installation day to establish a benchmark numerical model; stimulating different scour depths of the bridge with the benchmark numerical model by deleting spring units at different depths to obtain natural vibration frequencies under different scour depth working conditions; carrying out manual neural network training on partial natural vibration frequency results and corresponding scour depths obtained through stimulation, and carrying out checking with the rest of the natural vibration frequency results to ensure the accuracy of a network model, wherein the grid model selects a natural vibration frequency sensitive order as a network input parameter, and an output parameter is the scour depth; inputting corresponding natural vibration frequencies identified by the actual measured acceleration data of the pile top and the pile cap into the manual neural network, thereby obtaining bridge scour depth values; and conversing the dynamic strain data into dynamic deflection data of the pile to evaluate bridge operation safety statuses by adopting a strain-curvature-deflection relationship through a curvature function-based method;

2) under a rugged environment:

2.1) carrying out control to simultaneously turn on the three subsystems of the intelligent monitoring system by the data industrial personal computer to realize dynamic online operation of the three subsystems so as to obtain clock-synchronous real-time monitoring data of the three subsystems, obtaining sounding data of the single beam echo sounder in the adjustable sound velocity underwater depth monitoring system according to the step 1.1), obtaining pressure and seepage pressure data in the scoured seabed soil pressure change testing system according to the step 1.2), and obtaining acceleration data and dynamic strain data according to the high-frequency real-time bridge dynamic characteristic monitoring system in the step 1.3), thereby obtaining scour depths through respective conversion of the high-frequency real-time bridge dynamic characteristic monitoring system, the adjustable sound velocity underwater depth monitoring system and the scoured seabed soil pressure change testing system.

7. A scour depth evaluating method of the system for bridge scour multi-source monitoring according to claim 1, comprising the following steps:

carrying out dynamic weight selection in consideration of an analytic hierarchy process to select dynamic weight of the intelligent monitoring system as a target hierarchy, take a water flow velocity, a water depth, a silt grain size, a suspended matter concentration, an environmental vibration magnitude and an external scour environment as a criterion hierarchy, and take the three subsystems of the intelligent monitoring system as a project hierarchy so as to form a structural model for multi-hierarchy intelligent monitoring system dynamic weight selection, constructing a judgment matrix and carrying out the steps of single hierarchical arrangement and consistency check thereof as well as total hierarchical arrangement and consistency check thereof, and carrying out real-time analysis on dynamic weight selection of the intelligent monitoring system for bridge pile foundation scour to obtain dynamic weights $\lambda_1$, $\lambda_2$, $\lambda_3$ of the high-frequency real-time bridge dynamic characteristic monitoring system, the adjustable sound velocity underwater depth monitoring system and the scoured seabed soil pressure change testing system, wherein since all the monitoring data of the three subsystems are finally conversed into scour depth values, all the weights are normalized according to the following formulas:

$$a_1 = \lambda_1/(\lambda_1 + \lambda_2 + \lambda_3)$$

$$a_2 = \lambda_2/(\lambda_1 + \lambda_2 + \lambda_3)$$

$$a_3 = \lambda_3/(\lambda_1 + \lambda_2 + \lambda_3);$$

carrying out multi-source data fusion on actual bridge scour depths in accordance with the result of weight normalization:

$$y_b = a_1 y_1 + a_2 y_2 + a_3 y_3$$

wherein $y_b$ is a scour depth through multi-source monitoring data fusion, $a_1$, $a_2$, $a_3$ are normalized dynamic values of the high-frequency real-time bridge dynamic characteristic monitoring system, the adjustable sound velocity underwater depth monitoring system and the scoured seabed soil pressure change testing system, and $y_1$, $y_2$, $y_3$ are scour depths obtained through respective conversion of the high-frequency real-time bridge dynamic characteristic monitoring system, the adjustable sound velocity underwater depth monitoring system and the scoured seabed soil pressure change testing system.

8. A monitoring method of the system for bridge scour multi-source monitoring according to claim 2, comprising the following steps:
1) under an ordinary weather environment:
1.1) installing the seepage pressure sensor on the pile surface at the stainless hoop, wherein the seepage pressure sensor operates in real time, data are uploaded to the data industrial personal computer through wires, the data industrial personal computer obtains real-time tidal level data through a preset algorithm, then controls turning on and off of the single beam echo sounder in accordance with whether or not the real-time tidal level data reach a set monitoring threshold, and sets a wave velocity in accordance with the propagation velocity of sound wave in an actual marine environment, so as to avoid affecting monitoring accuracy by systematic error caused by complicated and volatile external environment and long-time operation of the single beam echo sounder, and monitoring data of the single beam echo sounder shows the depth change of a scour interface at a bridge pile foundation measuring point;

setting an acquisition threshold h' of the single beam echo sounder, wherein the data industrial personal computer automatically controls the turning on and off of the single beam echo sounder through a tidal level elevation obtained by conversion of the seepage pressure sensor that is installed on the pile surface at the stainless hoop, a sounding sampling is carried out when the tidal level is greater than h', and the sounding sampling is stopped when the tidal level is less than h', so as to avoid affecting monitoring accuracy by accumulation of measuring error caused by long-time operation of the single beam echo sounder; in order to prevent the contingency of single data, when a considerable amount of measuring data reach h', turning on and off of the single beam echo sounder is automatically controlled; measuring data $h_{tr}$ of depths from a bottom surface of the transducer of the single beam echo sounder to a water bottom shows a change of a soil layer interface of an upstream side of the pile, and then the change $\Delta h_{tr}$ of a scour depth is obtained based on the difference of the depths, that are measured at different time, from the bottom surface of the transducer of the single beam echo sounder to the water bottom; and relevant calculation theory thereof is as follows:

$$h_1 = P_k/\gamma_1 - h_2$$
$$h_{tr} = \frac{1}{2}Ct$$

wherein $h_1$ is the tidal level elevation; $P_k$ is an actual measured data of the seepage pressure sensor on the pile surface at the stainless hoop; $\gamma_1$ is the volume weight of seawater; $h_2$ is a distance from the seepage pressure sensor on the pile surface at the stainless hoop to a datum plane of the tidal level; $h_{tr}$ is a distance from a bottom of the transducer of the single beam echo sounder to a seabed surface; C is an actual average sound velocity of the seawater; and t is two-way time of the sound waves;

1.2) setting an amplitude of change of depths of the single beam echo sounder, wherein when sounding data reaches the amplitude of change, the data industrial personal computer carries out automatic control to turn on the high-frequency real-time bridge dynamic characteristic monitoring system and the scoured seabed soil pressure change testing system to make the three subsystems operate normally, so as to obtain clock-synchronous real-time monitoring data of the three subsystems;

setting sampling frequencies of the pressure sensor and the seepage pressure sensor in the scoured seabed soil pressure change testing system, and averaging the pressure data $P_2$ and $P_3$ thereof, wherein data acquired by the pressure sensor includes soil layer pressure values and water pressure values, and data acquired by the seepage pressure sensor only includes water pressure values, namely, a silt scour or back-silting pressure value $\Delta P$ is reflected by a value difference between the pressure sensor and the seepage pressure sensor; and the seabed soil effective unit weight $\gamma_2$ is measured by carrying out drilling sampling on a seabed bearing stratum, namely, a silt scour or back-silting thickness $h_3$ on a lateral pile soil pressure monitoring system is obtained;

$$P_2 = \frac{1}{n}\sum_{i=1}^{n} P_i, P_3 = \frac{1}{n}\sum_{j=1}^{n} P_j$$
$$\Delta P = P_2 - P_3$$
$$h_3 = \frac{\Delta P}{\gamma_2}$$

wherein $P_i$ is an actual measured data of the pressure sensor in the scoured seabed soil pressure change testing system, i is actual measured data points of the pressure sensor at different time, n is a number of data, $P_j$ is an actual measured data of the seepage pressure sensor in the scoured seabed soil pressure change testing system, and j is actual measured data points of the seepage pressure sensor at different time;

when an interface of the seabed bearing stratum changes, judging whether or not an absolute position of a system device changes by further analyzing the scoured seabed soil pressure change testing system and the seepage pressure sensor on the pile surface at the stainless hoop, and then comprehensively judging a change of a scour depth by considering the silt scour or back-silting situation;

$$P_1 = \frac{1}{n}\sum_{k=1}^{n} P_k$$
$$h_4 = (P_3 - P_1)/\gamma_1$$

wherein $h_4$ is a depth from the scoured seabed soil pressure change testing system to the seepage pressure sensor on the pile surface at the stainless hoop; $P_k$ is an actual measured data of the seepage pressure sensor on the pile surface at the stainless hoop, n is a number of data points, and k is actual measured data points of the seepage pressure sensor on the pile surface at the stainless hoop at different time; and $P_1$ is an average value of seepage pressures monitored by the seepage pressure sensor on the pile surface at the stainless hoop;

1.3) carrying out high-frequency dynamic monitoring on acceleration data of the pile top and the pile cap as well as dynamic strain data of the top and bottom of the pile by the high-frequency real-time bridge dynamic characteristic monitoring system, acquiring acceleration signals under action of earth pulsation, and carrying out spectral analysis on the signals to obtain structural natural vibration frequency information contained in response signals; carrying out modeling and grid dividing on a bridge model based on ANSYS finite element software, and simulating pile-soil interaction by setting spring units in the ANSYS finite element software, wherein the spring stiffness K is determined by an m method, and a value model is modified by combining a scour depth obtained by manual underwater exploration in an installation day with the actual measured acceleration data for the installation day to establish a benchmark numerical model; stimulating different scour depths of the bridge with the benchmark numerical model by deleting spring units at different depths to obtain natural vibration frequencies under different scour depth working conditions; carrying out manual neural network training on partial natural vibration frequency results and corresponding scour depths obtained through stimulation, and carrying out checking with the rest of the natural vibration frequency results to ensure the accuracy of a network model, wherein the grid model selects a natural vibration frequency sensitive order as a network input parameter, and an output parameter is the scour depth; inputting corresponding natural vibration frequencies identified by the actual measured acceleration data of the pile top and the pile cap into the manual neural network, thereby obtaining bridge scour depth values; and conversing the dynamic strain data into dynamic deflection data of the pile to evaluate bridge operation safety statuses by adopting a strain-curvature-deflection relationship through a curvature function-based method;

2) under a rugged environment:

2.1) carrying out control to simultaneously turn on the three subsystems of the intelligent monitoring system by the data industrial personal computer to realize dynamic online operation of the three subsystems so as to obtain clock-synchronous real-time monitoring data of the three subsystems, obtaining sounding data of the single beam echo sounder in the adjustable sound velocity underwater depth monitoring system according to the step 1.1), obtaining pressure and seepage pressure data in the scoured seabed soil pressure change testing system according to the step 1.2), and obtaining acceleration data and dynamic strain data according to the high-frequency real-time bridge dynamic characteristic monitoring system in the step 1.3), thereby obtaining scour depths through respective conversion of the high-frequency real-time bridge dynamic characteristic monitoring system, the adjustable sound velocity underwater depth monitoring system and the scoured seabed soil pressure change testing system.

9. A monitoring method of the system for bridge scour multi-source monitoring according to claim 3, comprising the following steps:

1) under an ordinary weather environment:

1.1) installing the seepage pressure sensor on the pile surface at the stainless hoop, wherein the seepage pressure sensor operates in real time, data are uploaded to the data industrial personal computer through wires, the data industrial personal computer obtains real-time tidal level data through a preset algorithm, then controls turning on and off of the single beam echo sounder in accordance with whether or not the real-time tidal level data reach a set monitoring threshold, and sets a wave velocity in accordance with the propagation velocity of sound wave in an actual marine environment, so as to avoid affecting monitoring accuracy by systematic error caused by complicated and volatile external environment and long-time operation of the single beam echo sounder, and monitoring data of the single beam echo sounder shows the depth change of a scour interface at a bridge pile foundation measuring point;

setting an acquisition threshold h' of the single beam echo sounder, wherein the data industrial personal computer automatically controls the turning on and off of the single beam echo sounder through a tidal level elevation obtained by conversion of the seepage pressure sensor that is installed on the pile surface at the stainless hoop, a sounding sampling is carried out when the tidal level is greater than h', and the sounding sampling is stopped when the tidal level is less than h', so as to avoid affecting monitoring accuracy by accumulation of measuring error caused by long-time operation of the single beam echo sounder; in order to prevent the contingency of single data, when a considerable amount of measuring data reach h', turning on and off of the single beam echo sounder is automatically controlled; measuring data $h_{tr}$ of depths from a bottom surface of the transducer of the single beam echo sounder to a water bottom shows a change of a soil layer interface of an upstream side of the pile, and then the change $\Delta h_{tr}$ of a scour depth is obtained based on the difference of the depths, that are measured at different time, from the bottom surface of the transducer of the single beam echo sounder to the water bottom; and relevant calculation theory thereof is as follows:

$$h_1 = P_k/\gamma_1 - h_2$$

$$h_{tr} = \frac{1}{2}Ct$$

wherein $h_1$ is the tidal level elevation; $P_k$ is an actual measured data of the seepage pressure sensor on the pile surface at the stainless hoop; $\gamma_1$ is the volume weight of seawater; $h_2$ is a distance from the seepage pressure sensor on the pile surface at the stainless hoop to a datum plane of the tidal level; $h_{tr}$ is a distance from a bottom of the transducer of the single beam echo sounder to a seabed surface; C is an actual average sound velocity of the seawater; and t is two-way time of the sound waves;

1.2) setting an amplitude of change of depths of the single beam echo sounder, wherein when sounding data reaches the amplitude of change, the data industrial personal computer carries out automatic control to turn on the high-frequency real-time bridge dynamic characteristic monitoring system and the scoured seabed soil pressure change testing system to make the three subsystems operate normally, so as to obtain clock-synchronous real-time monitoring data of the three subsystems;

setting sampling frequencies of the pressure sensor and the seepage pressure sensor in the scoured seabed soil pressure change testing system, and averaging the pressure data $P_2$ and $P_3$ thereof, wherein data acquired by the pressure sensor includes soil layer pressure values and water pressure values, and data acquired by the seepage pressure sensor only includes water pressure values, namely, a silt scour or back-silting pressure value $\Delta P$ is reflected by a value difference between the pressure sensor and the seepage pressure sensor; and the seabed soil effective unit weight $\gamma_2$ is measured by carrying out drilling sampling on a seabed bearing stratum, namely, a silt scour or back-silting thickness $h_3$ on a lateral pile soil pressure monitoring system is obtained;

$$P_2 = \frac{1}{n}\sum_{i=1}^{n} P_i, \; P_3 = \frac{1}{n}\sum_{j=1}^{n} P_j$$

$$\Delta P = P_2 - P_3$$

$$h_3 = \frac{\Delta P}{\gamma_2}$$

wherein $P_i$ is an actual measured data of the pressure sensor in the scoured seabed soil pressure change testing system, i is actual measured data points of the pressure sensor at different time, n is a number of data, $P_j$ is an actual measured data of the seepage pressure sensor in the scoured seabed soil pressure change testing system, and j is actual measured data points of the seepage pressure sensor at different time;

when an interface of the seabed bearing stratum changes, judging whether or not an absolute position of a system device changes by further analyzing the scoured seabed soil pressure change testing system and the seepage pressure sensor on the pile surface at the stainless hoop, and then comprehensively judging a change of a scour depth by considering the silt scour or back-silting situation;

$$P_1 = \frac{1}{n}\sum_{k=1}^{n} P_k$$

$$h_4 = (P_3 - P_1)/\gamma_1$$

wherein $h_4$ is a depth from the scoured seabed soil pressure change testing system to the seepage pressure sensor on the pile surface at the stainless hoop; $P_k$ is an actual measured data of the seepage pressure sensor on the pile surface at the stainless hoop, n is a number of data points, and k is actual measured data points of the seepage pressure sensor on the pile surface at the stainless hoop at different time; and $P_1$ is an average value of seepage pressures monitored by the seepage pressure sensor on the pile surface at the stainless hoop;

1.3) carrying out high-frequency dynamic monitoring on acceleration data of the pile top and the pile cap as well as dynamic strain data of the top and bottom of the pile by the high-frequency real-time bridge dynamic characteristic monitoring system, acquiring acceleration signals under action of earth pulsation, and carrying out spectral analysis on the signals to obtain structural natural vibration frequency information contained in response signals; carrying out modeling and grid dividing on a bridge model based on ANSYS finite element software, and simulating pile-soil interaction by setting spring units in the ANSYS finite element software, wherein the spring stiffness K is determined by an m method, and a value model is modified by combining a scour depth obtained by manual underwater exploration in an installation day with the actual measured acceleration data for the installation day to establish a benchmark numerical model; stimulating different scour depths of the bridge with the benchmark numerical model by deleting spring units at different depths to obtain natural vibration frequencies under different scour depth working conditions; carrying out manual neural network training on partial natural vibration frequency results and corresponding scour depths obtained through stimulation, and carrying out checking with the rest of the natural vibration frequency results to ensure the accuracy of a network model, wherein the grid model selects a natural vibration frequency sensitive order as a network input parameter, and an output parameter is the scour depth; inputting corresponding natural vibration frequencies identified by the actual measured acceleration data of the pile top and the pile cap into the manual neural network, thereby obtaining bridge scour depth values; and conversing the dynamic strain data into dynamic deflection data of the pile to evaluate bridge operation safety statuses by adopting a strain-curvature-deflection relationship through a curvature function-based method;

2) under a rugged environment:

2.1) carrying out control to simultaneously turn on the three subsystems of the intelligent monitoring system by the data industrial personal computer to realize dynamic online operation of the three subsystems so as to obtain clock-synchronous real-time monitoring data of the three subsystems, obtaining sounding data of the single beam echo sounder in the adjustable sound velocity underwater depth monitoring system according to the step 1.1), obtaining pressure and seepage pressure data in the scoured seabed soil pressure change testing system according to the step 1.2), and obtaining acceleration data and dynamic strain data according to the high-frequency real-time bridge dynamic characteristic monitoring system in the step 1.3), thereby obtaining scour depths through respective conversion of the high-frequency real-time bridge dynamic characteristic monitoring system, the adjustable sound velocity underwater depth monitoring system and the scoured seabed soil pressure change testing system.

10. A monitoring method of the system for bridge scour multi-source monitoring according to claim 4, comprising the following steps:

1) under an ordinary weather environment:

1.1) installing the seepage pressure sensor on the pile surface at the stainless hoop, wherein the seepage pressure sensor operates in real time, data are uploaded to the data industrial personal computer through wires, the data industrial personal computer obtains real-time tidal level data through a preset algorithm, then controls turning on and off of the single beam echo sounder in accordance with whether or not the real-time tidal level data reach a set monitoring threshold, and sets a wave velocity in accordance with the propagation velocity of sound wave in an actual marine environment, so as to avoid affecting monitoring accuracy by systematic error caused by complicated and volatile external environment and long-time operation of the single beam echo sounder, and monitoring data of the single beam echo sounder shows the depth change of a scour interface at a bridge pile foundation measuring point;

setting an acquisition threshold h' of the single beam echo sounder, wherein the data industrial personal computer automatically controls the turning on and off of the single beam echo sounder through a tidal level elevation obtained by conversion of the seepage pressure sensor that is installed on the pile surface at the stainless hoop, a sounding sampling is carried out when the tidal level is greater than h', and the sounding sampling is stopped when the tidal level is less than h', so as to avoid affecting monitoring accuracy by accumulation of measuring error caused by long-time operation of the single beam echo sounder; in order to prevent the contingency of single data, when a considerable amount of measuring data reach h', turning on and off of the single beam echo sounder is automatically controlled; measuring data $h_{tr}$ of depths from a bottom surface of the transducer of the single beam echo sounder to a water bottom shows a change of a soil layer interface of an upstream side of the pile, and then the change $\Delta h_{tr}$ of a scour depth is obtained based on the difference of the depths, that are measured at different time, from the bottom surface of the transducer of the single beam echo sounder to the water bottom; and relevant calculation theory thereof is as follows:

$$h_1 = P_k/\gamma_1 - h_2$$

$$h_{tr} = \frac{1}{2}Ct$$

wherein $h_1$ is the tidal level elevation; $P_k$ is an actual measured data of the seepage pressure sensor on the pile surface at the stainless hoop; $\gamma_1$ is the volume weight of seawater; $h_2$ is a distance from the seepage pressure sensor on the pile surface at the stainless hoop to a datum plane of the tidal level; $h_{tr}$ is a distance from a bottom of the transducer of the single beam echo sounder to a seabed surface; C is an actual average sound velocity of the seawater; and t is two-way time of the sound waves;

1.2) setting an amplitude of change of depths of the single beam echo sounder, wherein when sounding data reaches the amplitude of change, the data industrial personal computer carries out automatic control to turn on the high-frequency real-time bridge dynamic characteristic monitoring system and the scoured seabed soil pressure change testing system to make the three subsystems operate normally, so as to obtain clock-synchronous real-time monitoring data of the three subsystems;

setting sampling frequencies of the pressure sensor and the seepage pressure sensor in the scoured seabed soil pressure change testing system, and averaging the pressure data $P_2$ and $P_3$ thereof, wherein data acquired by the pressure sensor includes soil layer pressure values and water pressure values, and data acquired by the seepage pressure sensor only includes water pressure values, namely, a silt scour or back-silting pressure value $\Delta P$ is reflected by a value difference between the pressure sensor and the seepage pressure sensor; and the seabed soil effective unit weight $\gamma_2$ is measured by carrying out drilling sampling on a seabed bearing stratum, namely, a silt scour or back-silting thickness $h_3$ on a lateral pile soil pressure monitoring system is obtained;

$$P_2 = \frac{1}{n}\sum_{i=1}^{n} P_i,\ P_3 = \frac{1}{n}\sum_{j=1}^{n} P_j$$

$$\Delta P = P_2 - P_3$$

$$h_3 = \frac{\Delta P}{\gamma_2}$$

wherein $P_i$ is an actual measured data of the pressure sensor in the scoured seabed soil pressure change testing system, i is actual measured data points of the pressure sensor at different time, n is a number of data, $P_j$ is an actual measured data of the seepage pressure sensor in the scoured seabed soil pressure change testing system, and j is actual measured data points of the seepage pressure sensor at different time;

when an interface of the seabed bearing stratum changes, judging whether or not an absolute position of a system device changes by further analyzing the scoured seabed soil pressure change testing system and the seepage pressure sensor on the pile surface at the stainless hoop, and then comprehensively judging a change of a scour depth by considering the silt scour or back-silting situation;

$$P_1 = \frac{1}{n}\sum_{k=1}^{n} P_k$$

$$h_4 = (P_3 - P_1)/\gamma_1$$

wherein $h_4$ is a depth from the scoured seabed soil pressure change testing system to the seepage pressure sensor on the pile surface at the stainless hoop; $P_k$ is an actual measured data of the seepage pressure sensor on the pile surface at the stainless hoop, n is a number of data points, and k is actual measured data points of the seepage pressure sensor on the pile surface at the stainless hoop at different time; and $P_1$ is an average value of seepage pressures monitored by the seepage pressure sensor on the pile surface at the stainless hoop;

1.3) carrying out high-frequency dynamic monitoring on acceleration data of the pile top and the pile cap as well as dynamic strain data of the top and bottom of the pile by the high-frequency real-time bridge dynamic characteristic monitoring system, acquiring acceleration signals under action of earth pulsation, and carrying out spectral analysis on the signals to obtain structural natural vibration frequency information contained in response signals; carrying out modeling and grid dividing on a bridge model based on ANSYS finite element software, and simulating pile-soil interaction by setting spring units in the ANSYS finite element software, wherein the spring stiffness K is determined by an m method, and a value model is modified by combining a scour depth obtained by manual underwater exploration in an installation day with the actual measured acceleration data for the installation day to establish a benchmark numerical model; stimulating different scour depths of the bridge with the benchmark numerical model by deleting spring units at different depths to obtain natural vibration frequencies under different scour depth working conditions; carrying out manual neural network training on partial natural vibration frequency results and corresponding scour depths obtained through stimulation, and carrying out checking with the rest of the natural vibration frequency results to ensure the accuracy of a network model, wherein the grid model selects a natural vibration frequency sensitive order as a network input parameter, and an output parameter is the scour depth; inputting corresponding natural vibration frequencies identified by the actual measured acceleration data of the pile top and the pile cap into the manual neural network, thereby obtaining bridge scour depth values; and conversing the dynamic strain data into dynamic deflection data of the pile to evaluate bridge operation safety statuses by adopting a strain-curvature-deflection relationship through a curvature function-based method;

2) under a rugged environment:

2.1) carrying out control to simultaneously turn on the three subsystems of the intelligent monitoring system by the data industrial personal computer to realize dynamic online operation of the three subsystems so as to obtain clock-synchronous real-time monitoring data of the three subsystems, obtaining sounding data of the single beam echo sounder in the adjustable sound velocity underwater depth monitoring system according to the step 1.1), obtaining pressure and seepage pressure data in the scoured seabed soil pressure change testing system according to the step 1.2), and obtaining acceleration data and dynamic strain data according to the high-frequency real-time bridge dynamic characteristic monitoring system in the step 1.3), thereby obtaining scour depths through respective conversion of the high-frequency real-time bridge dynamic characteristic monitoring system, the adjustable sound velocity underwater depth monitoring system and the scoured seabed soil pressure change testing system.

11. A monitoring method of the system for bridge scour multi-source monitoring according to claim 5, comprising the following steps:

1) under an ordinary weather environment:

1.1) installing the seepage pressure sensor on the pile surface at the stainless hoop, wherein the seepage pressure sensor operates in real time, data are uploaded to the data industrial personal computer through wires, the data industrial personal computer obtains real-time tidal level data through a preset algorithm, then controls turning on and off of the single beam echo sounder in accordance with whether or not the real-time tidal level data reach a set monitoring threshold, and sets a wave velocity in accordance with the propagation velocity of sound wave in an actual marine environment, so as to avoid affecting monitoring accuracy by systematic error caused by complicated and volatile external environment and long-time operation of the single beam echo sounder, and monitoring data of the single beam echo sounder shows the depth change of a scour interface at a bridge pile foundation measuring point;

setting an acquisition threshold h' of the single beam echo sounder, wherein the data industrial personal computer automatically controls the turning on and off of the single beam echo sounder through a tidal level elevation obtained by conversion of the seepage pressure sensor that is installed on the pile surface at the stainless hoop, a sounding sampling is carried out when the tidal level is greater than h', and the sounding sampling is stopped when the tidal level is less than h', so as to avoid affecting monitoring accuracy by accumulation of measuring error caused by long-time operation of the single beam echo sounder; in order to prevent the contingency of single data, when a considerable amount of measuring data reach h', turning on and off of the single beam echo sounder is automatically controlled; measuring data $h_{tr}$ of depths from a bottom surface of the transducer of the single beam echo sounder to a water bottom shows a change of a soil layer interface of an upstream side of the pile, and then the change $\Delta h_{tr}$ of a scour depth is obtained based on the difference of the depths, that are measured at different time, from the bottom surface of the transducer of the single beam echo sounder to the water bottom; and relevant calculation theory thereof is as follows:

$$h_1 = P_k/\gamma_1 - h_2$$

$$h_{tr} = \frac{1}{2}Ct$$

wherein $h_1$ is the tidal level elevation; $P_k$ is an actual measured data of the seepage pressure sensor on the pile surface at the stainless hoop; $\gamma_1$ is the volume weight of seawater; $h_2$ is a distance from the seepage pressure sensor on the pile surface at the stainless hoop to a datum plane of the tidal level; $h_{tr}$ is a distance from a bottom of the transducer of the single beam echo sounder to a seabed surface; C is an actual average sound velocity of the seawater; and t is two-way time of the sound waves;

1.2) setting an amplitude of change of depths of the single beam echo sounder, wherein when sounding data reaches the amplitude of change, the data industrial personal computer carries out automatic control to turn on the high-frequency real-time bridge dynamic characteristic monitoring system and the scoured seabed soil pressure change testing system to make the three subsystems operate normally, so as to obtain clock-synchronous real-time monitoring data of the three subsystems;

setting sampling frequencies of the pressure sensor and the seepage pressure sensor in the scoured seabed soil pressure change testing system, and averaging the pressure data $P_2$ and $P_3$ thereof, wherein data acquired by the pressure sensor includes soil layer pressure values and water pressure values, and data acquired by the seepage pressure sensor only includes water pressure values, namely, a silt scour or back-silting pressure value $\Delta P$ is reflected by a value difference between the pressure sensor and the seepage pressure sensor; and the seabed soil effective unit weight $\gamma_2$ is measured by carrying out drilling sampling on a seabed bearing stratum, namely, a silt scour or back-silting thickness $h_3$ on a lateral pile soil pressure monitoring system is obtained;

$$P_2 = \frac{1}{n}\sum_{i=1}^{n} P_i, P_3 = \frac{1}{n}\sum_{j=1}^{n} P_j$$

$$\Delta P = P_2 - P_3$$

$$h_3 = \frac{\Delta P}{\gamma_2}$$

wherein $P_i$ is an actual measured data of the pressure sensor in the scoured seabed soil pressure change testing system, i is actual measured data points of the pressure sensor at different time, n is a number of data, $P_j$ is an actual measured data of the seepage pressure sensor in the scoured seabed soil pressure change testing system, and j is actual measured data points of the seepage pressure sensor at different time;

when an interface of the seabed bearing stratum changes, judging whether or not an absolute position of a system device changes by further analyzing the scoured seabed soil pressure change testing system and the seepage pressure sensor on the pile surface at the stainless hoop, and then comprehensively judging a change of a scour depth by considering the silt scour or back-silting situation;

$$P_1 = \frac{1}{n}\sum_{k=1}^{n} P_k$$

$$h_4 = (P_3 - P_1)/\gamma_1$$

wherein $h_4$ is a depth from the scoured seabed soil pressure change testing system to the seepage pressure sensor on the pile surface at the stainless hoop; $P_k$ is an actual measured data of the seepage pressure sensor on the pile surface at the stainless hoop, n is a number of data points, and k is actual measured data points of the seepage pressure sensor on the pile surface at the stainless hoop at different time; and $P_1$ is an average value of seepage pressures monitored by the seepage pressure sensor on the pile surface at the stainless hoop;

1.3) carrying out high-frequency dynamic monitoring on acceleration data of the pile top and the pile cap as well as dynamic strain data of the top and bottom of the pile by the high-frequency real-time bridge dynamic characteristic monitoring system, acquiring acceleration signals under action of earth pulsation, and carrying out spectral analysis on the signals to obtain structural natural vibration frequency information contained in response signals; carrying out modeling and grid dividing on a bridge model based on ANSYS finite element software, and simulating pile-soil interaction by setting spring units in the ANSYS finite element software, wherein the spring stiffness K is determined by an m method, and a value model is modified by combining a scour depth obtained by manual underwater exploration in an installation day with the actual measured acceleration data for the installation day to establish a benchmark numerical model; stimulating different scour depths of the bridge with the benchmark numerical model by deleting spring units at different depths to obtain natural vibration frequencies under different scour depth working conditions; carrying out manual neural network training on partial natural vibration frequency results and corresponding scour depths obtained through stimulation, and carrying out checking with the rest of the natural vibration frequency results to ensure the accuracy of a network model, wherein the grid model selects a natural vibration frequency sensitive order as a network input parameter, and an output parameter is the scour depth; inputting corresponding natural vibration frequencies identified by the actual measured acceleration data of the pile top and the pile cap into the manual neural network, thereby obtaining bridge scour depth values; and conversing the dynamic strain data into dynamic deflection data of the pile to evaluate bridge operation safety statuses by adopting a strain-curvature-deflection relationship through a curvature function-based method;

2) under a rugged environment:

2.1) carrying out control to simultaneously turn on the three subsystems of the intelligent monitoring system by the data industrial personal computer to realize dynamic online operation of the three subsystems so as to obtain clock-synchronous real-time monitoring data of the three subsystems, obtaining sounding data of the single beam echo sounder in the adjustable sound velocity underwater depth monitoring system according to the step 1.1), obtaining pressure and seepage pressure data in the scoured seabed soil pressure change testing system according to the step 1.2), and obtaining acceleration data and dynamic strain data according to the high-frequency real-time bridge dynamic characteristic monitoring system in the step 1.3), thereby obtaining scour depths through respective conversion of the high-frequency real-time bridge dynamic characteristic monitoring system, the adjustable sound velocity underwater depth monitoring system and the scoured seabed soil pressure change testing system.

12. A scour depth evaluating method of the system for bridge scour multi-source monitoring according to claim 2, comprising the following steps:

carrying out dynamic weight selection in consideration of an analytic hierarchy process to select dynamic weight of the intelligent monitoring system as a target hierarchy, take a water flow velocity, a water depth, a silt grain size, a suspended matter concentration, an environmental vibration magnitude and an external scour environment as a criterion hierarchy, and take the three subsystems of the intelligent monitoring system as a project hierarchy so as to form a structural model for multi-hierarchy intelligent monitoring system dynamic weight selection, constructing a judgment matrix and carrying out the steps of single hierarchical arrangement and consistency check thereof as well as total hierarchical arrangement and consistency check thereof, and carrying out real-time analysis on dynamic weight selection of the intelligent monitoring system for bridge pile foundation scour to obtain dynamic weights $\lambda_1$, $\lambda_2$, $\lambda_3$ of the high-frequency real-time bridge dynamic characteristic monitoring system, the adjustable sound velocity underwater depth monitoring system and the scoured seabed soil pressure change testing system, wherein since all the monitoring data of the three subsystems are finally conversed into scour depth values, all the weights are normalized according to the following formulas:

$$a_1 = \lambda_1/(\lambda_1 + \lambda_2 + \lambda_3)$$
$$a_2 = \lambda_2/(\lambda_1 + \lambda_2 + \lambda_3)$$
$$a_3 = \lambda_3/(\lambda_1 + \lambda_2 + \lambda_3);$$

carrying out multi-source data fusion on actual bridge scour depths in accordance with the result of weight normalization:

$$y_b = a_1 y_1 + a_2 y_2 + a_3 y_3$$

wherein $y_b$ is a scour depth through multi-source monitoring data fusion, $a_1$, $a_2$, $a_3$ are normalized dynamic values of the high-frequency real-time bridge dynamic characteristic monitoring system, the adjustable sound velocity underwater depth monitoring system and the scoured seabed soil pressure change testing system, and $y_1$, $y_2$, $y_3$ are scour depths obtained through respective conversion of the high-frequency real-time bridge dynamic characteristic monitoring system, the adjustable sound velocity underwater depth monitoring system and the scoured seabed soil pressure change testing system.

13. A scour depth evaluating method of the system for bridge scour multi-source monitoring according to claim 3, comprising the following steps:

carrying out dynamic weight selection in consideration of an analytic hierarchy process to select dynamic weight of the intelligent monitoring system as a target hierarchy, take a water flow velocity, a water depth, a silt grain size, a suspended matter concentration, an environmental vibration magnitude and an external scour environment as a criterion hierarchy, and take the three subsystems of the intelligent monitoring system as a project hierarchy so as to form a structural model for multi-hierarchy intelligent monitoring system dynamic weight selection, constructing a judgment matrix and carrying out the steps of single hierarchical arrangement and consistency check thereof as well as total hierarchical arrangement and consistency check thereof, and carrying out real-time analysis on dynamic weight selection of the intelligent monitoring system for bridge pile foundation scour to obtain dynamic weights $\lambda_1$, $\lambda_2$, $\lambda_3$ of the high-frequency real-time bridge dynamic characteristic monitoring system, the adjustable sound velocity underwater depth monitoring system and the scoured seabed soil pressure change testing system, wherein since all the monitoring data of the three subsystems are finally conversed into scour depth values, all the weights are normalized according to the following formulas:

$$a_1 = \lambda_1/(\lambda_1 + \lambda_2 + \lambda_3)$$
$$a_2 = \lambda_2/(\lambda_1 + \lambda_2 + \lambda_3)$$
$$a_3 = \lambda_3/(\lambda_1 + \lambda_2 + \lambda_3)$$

carrying out multi-source data fusion on actual bridge scour depths in accordance with the result of weight normalization:

$$y_b = a_1 y_1 + a_2 y_2 + a_3 y_3$$

wherein $y_b$ is a scour depth through multi-source monitoring data fusion, $a_1$, $a_2$, $a_3$ are normalized dynamic values of the high-frequency real-time bridge dynamic characteristic monitoring system, the adjustable sound velocity underwater depth monitoring system and the scoured seabed soil pressure change testing system, and $y_1$, $y_2$, $y_3$ are scour depths obtained through respective conversion of the high-frequency real-time bridge dynamic characteristic monitoring system, the adjustable sound velocity underwater depth monitoring system and the scoured seabed soil pressure change testing system.

14. A scour depth evaluating method of the system for bridge scour multi-source monitoring according to claim 4, comprising the following steps:

carrying out dynamic weight selection in consideration of an analytic hierarchy process to select dynamic weight of the intelligent monitoring system as a target hierarchy, take a water flow velocity, a water depth, a silt grain size, a suspended matter concentration, an environmental vibration magnitude and an external scour environment as a criterion hierarchy, and take the three subsystems of the intelligent monitoring system as a project hierarchy so as to form a structural model for multi-hierarchy intelligent monitoring system dynamic weight selection, constructing a judgment matrix and carrying out the steps of single hierarchical arrangement and consistency check thereof as well as total hierarchical arrangement and consistency check thereof, and carrying out real-time analysis on dynamic weight selection of the intelligent monitoring system for bridge pile foundation scour to obtain dynamic weights $\lambda_1$, $\lambda_2$, $\lambda_3$ of the high-frequency real-time bridge dynamic characteristic monitoring system, the adjustable sound velocity underwater depth monitoring system and the scoured seabed soil pressure change testing system, wherein since all the monitoring data of the three subsystems are finally conversed into scour depth values, all the weights are normalized according to the following formulas:

$$a_1 = \lambda_1/(\lambda_1 + \lambda_2 + \lambda_3)$$
$$a_2 = \lambda_2/(\lambda_1 + \lambda_2 + \lambda_3)$$
$$a_3 = \lambda_3/(\lambda_1 + \lambda_2 + \lambda_3)$$

carrying out multi-source data fusion on actual bridge scour depths in accordance with the result of weight normalization:

$$y_b = a_1 y_1 + a_2 y_2 + a_3 y_3$$

wherein $y_b$ is a scour depth through multi-source monitoring data fusion, $a_1$, $a_2$, $a_3$ are normalized dynamic values of the high-frequency real-time bridge dynamic characteristic monitoring system, the adjustable sound velocity underwater depth monitoring system and the scoured seabed soil pressure change testing system, and $y_1$, $y_2$, $y_3$ are scour depths obtained through respective conversion of the high-frequency real-time bridge dynamic characteristic monitoring system, the adjustable sound velocity underwater depth monitoring system and the scoured seabed soil pressure change testing system.

15. A scour depth evaluating method of the system for bridge scour multi-source monitoring according to claim 5, comprising the following steps:

carrying out dynamic weight selection in consideration of an analytic hierarchy process to select dynamic weight of the intelligent monitoring system as a target hierarchy, take a water flow velocity, a water depth, a silt grain size, a suspended matter concentration, an environmental vibration magnitude and an external scour environment as a criterion hierarchy, and take the three subsystems of the intelligent monitoring system as a project hierarchy so as to form a structural model for multi-hierarchy intelligent monitoring system dynamic weight selection, constructing a judgment matrix and carrying out the steps of single hierarchical arrangement and consistency check thereof as well as total hierarchical arrangement and consistency check thereof, and carrying out real-time analysis on dynamic weight selection of the intelligent monitoring system for bridge pile foundation scour to obtain dynamic weights $\lambda_1$, $\lambda_2$, $\lambda_3$ of the high-frequency real-time bridge dynamic characteristic monitoring system, the adjustable sound velocity underwater depth monitoring system and the scoured seabed soil pressure change testing system, wherein since all the monitoring data of the three subsystems are finally conversed into scour depth values, all the weights are normalized according to the following formulas:

$$a_1 = \lambda_1/(\lambda_1 + \lambda_2 + \lambda_3)$$
$$a_2 = \lambda_2/(\lambda_1 + \lambda_2 + \lambda_3)$$
$$a_3 = \lambda_3/(\lambda_1 + \lambda_2 + \lambda_3)$$

carrying out multi-source data fusion on actual bridge scour depths in accordance with the result of weight normalization:

$$y_b = a_1 y_1 + a_2 y_2 + a_3 y_3$$

wherein $y_b$ is a scour depth through multi-source monitoring data fusion, $a_1$, $a_2$, $a_3$ are normalized dynamic values of the high-frequency real-time bridge dynamic characteristic monitoring system, the adjustable sound velocity underwater depth monitoring system and the scoured seabed soil pressure change testing system, and $y_1$, $y_2$, $y_3$ are scour depths obtained through respective conversion of the high-frequency real-time bridge dynamic characteristic monitoring system, the adjustable sound velocity underwater depth monitoring system and the scoured seabed soil pressure change testing system.

* * * * *